(12) United States Patent
Sugita et al.

(10) Patent No.: US 6,656,072 B2
(45) Date of Patent: Dec. 2, 2003

(54) CHAIN TRANSMISSION ASSEMBLY

(75) Inventors: Haruomi Sugita, Saitama (JP); Masahiko Sekita, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/769,292

(22) Filed: Jan. 26, 2001

(65) Prior Publication Data

US 2001/0018379 A1 Aug. 30, 2001

(30) Foreign Application Priority Data

Jan. 28, 2000 (JP) ........................................ 2000-020653

(51) Int. Cl.$^7$ .............................................. F16H 55/30
(52) U.S. Cl. ........................ 474/161; 474/156; 474/160
(58) Field of Search .......................... 474/84, 148, 152, 474/153, 156, 160, 161

(56) References Cited

U.S. PATENT DOCUMENTS

| | | | | |
|---|---|---|---|---|
| 2,199,292 A | * | 4/1940 | Pierce | 474/156 |
| 4,099,424 A | * | 7/1978 | Pemberton | 474/156 |
| 5,360,378 A | * | 11/1994 | Suzuki et al. | 474/161 |
| 5,980,408 A | * | 11/1999 | Schultz | 474/161 |
| 5,984,817 A | * | 11/1999 | Schultz | 474/156 |

FOREIGN PATENT DOCUMENTS

| | | | | |
|---|---|---|---|---|
| DE | 296 21 083 U1 | * | 4/1998 | ........... F16H/55/30 |
| JP | U6182164 | | 5/1986 | |
| JP | A63214566 | | 9/1988 | |
| JP | A63251654 | | 10/1988 | |

* cited by examiner

Primary Examiner—William C Joyce
Assistant Examiner—Timothy McAnulty
(74) Attorney, Agent, or Firm—Birch, Stewart, Kolasch & Birch, LLP

(57) ABSTRACT

Projections colliding with constricted portions at the center of hourglass-shaped pin link plates and with constricted portions at the center of hourglass-shaped roller link plates are provided at an annular resilient body. When a roller chain starts to mesh with a sprocket, constricted portions at the centers of hourglass-shaped link plates of the roller chain can be pushed radially outwards from the sprocket by the projections of the resilient body, vibrations occurring at the roller chain meshing with the sprocket can be made small, vibrations at each part of the roller chain can be made small, collision speed when rollers of the roller chain collide with teeth bottoms of the sprockets can be reduced, and the generation of noise can be suppressed. Moreover, because hourglass-shaped link plates are used, the roller chain can be made lighter than when flat oval shaped or oval shaped link plates are used.

12 Claims, 9 Drawing Sheets

CHAIN TRANSMISSION ASSEMBLY

BACKGROUND OF THE INVENTION

1. Field of the Invention

The present invention relates to a chain transmission assembly suited to suppressing the occurrence of noise and making an assembly light in weight.

2. Description of Background Art

Figure 8A:
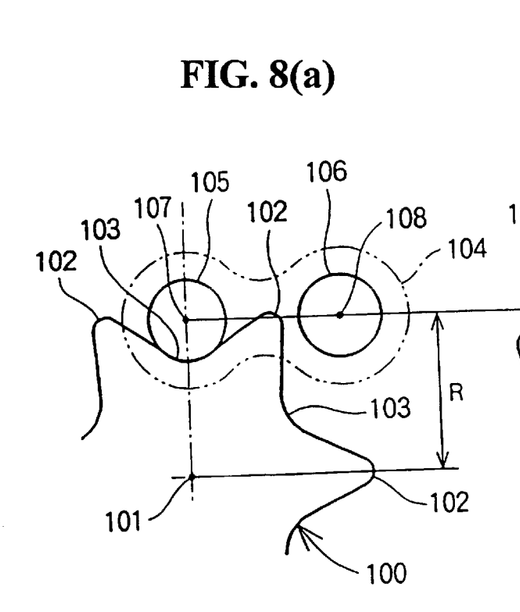
FIGS. 8(a)–8(c) show explanatory views showing the operation in the state where a related sprocket and roller chain mesh.
Figure 8B:
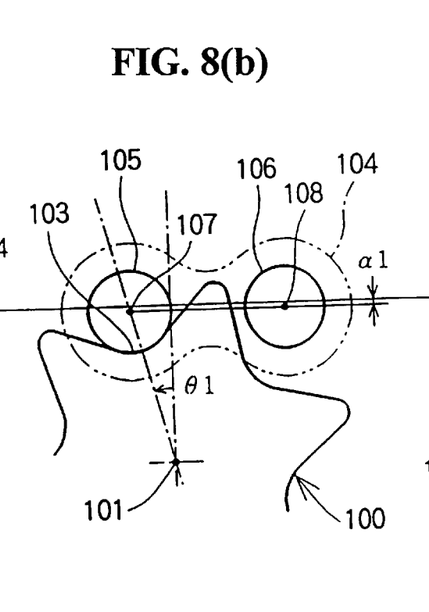
Figure 8C:
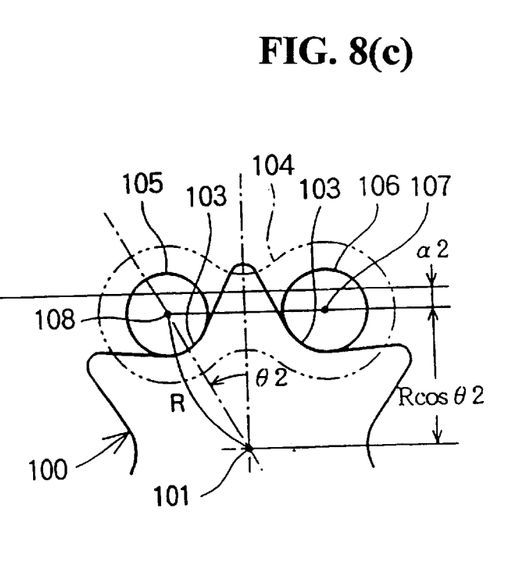

The following is a description of the meshing of sprocket teeth and rollers of a roller chain for a chain transmission assembly where a roller chain is wrapped around a sprocket. FIG. 8(a) to FIG. 8(c) are explanatory views showing the operation in the state where a related sprocket and roller chain mesh.

In FIG. 8(a), a sprocket 100, with a center of rotation 101 of the sprocket 100, includes teeth 102 . . . (where . . . shows a plurality of items, with the same being the case hereafter) of the sprocket 100, teeth bottoms 103 . . . of the of the sprocket 100, roll chain link plates 104 shown by an imaginary line (only one shown), roller chain rollers 105 and 106, and centers of rotation 107 and 108 of the rollers 105 and 106. In FIG. 8(a), the teeth bottoms 103 of the sprockets 100 are positioned just above the centers of rotation 101 and the rollers 105 mesh with the teeth bottoms 103.

In FIG. 8(b), when the sprockets 100 rotate by an angle of θ1 in an counterclockwise direction from the state in FIG. 8(a), the rollers 105 move while remaining meshed with the teeth bottoms 103 of the sprocket 100 and the centers of rotation 107 of the rollers 105 fall by just a distance ∝1 from the position of FIG. 8(a).

At this time, the rollers 105 and 106 move in an integral manner so that the roller chain goes from being loose to being tense, and the center of rotation of the roller 106 falls just by a distance ∝1 together with the dropping of the roller 105.

In FIG. 8(c), the sprocket 100 rotates further in the counter-clockwise direction so that when the sprocket 100 rotates by an angle θ2 from the state shown in FIG. 8(a), in addition to the rollers 105 and the teeth bottoms 103 of the sprocket 100 meshing, the rollers 106 meshes with the teeth bottoms 103.

The teeth bottoms 103 collide with the rollers 106 at this time so that a noise therefore occurs due to these collisions.

In this case, the centers of rotation 107 and 108 of the rollers 105 and 106 fall just by ∝2 from the position of FIG. 8(a), and the distance between the center of rotation 101 of the sprocket 100 and the centers of rotation 107 and 108 of the rollers 105 and 106 becomes R cos θ2. The wrapping radius of the roller chain in this case is R cos θ2, and an amount of vibration ∝2 of the roller chain in a vertical direction ∝2 is 2=R-R cos θ2.

In the above, when a roller chain meshes with the sprocket 100, noise is generated by the teeth bottoms 103 of the sprocket 100 and by the rollers 106 and the wrapping radius of the roller chain changes from R cos θ2 to R. The vibration of the roller chain is therefore substantial, and noise is therefore generated from the roller chain itself.

A chain transmission assembly combining a sprocket having a resilient member and a roller chain as shown in the following is well-known for reducing this kind of noise.

Figure 9A:
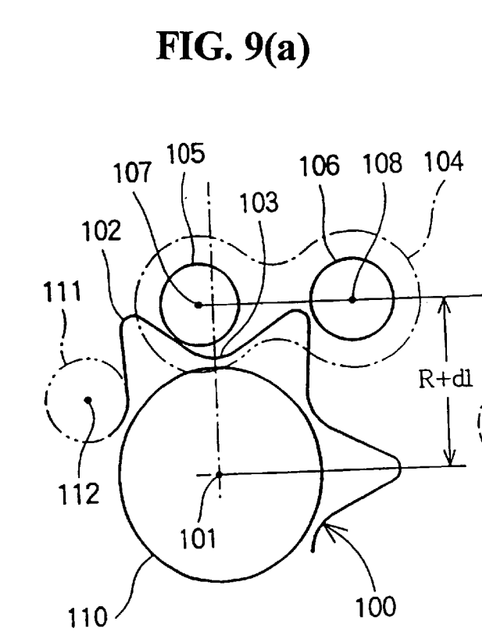
FIGS. 9(a)–9(c) are views illustrating the operation for the situation where a related sprocket with a resilient member and a roller chain mesh.
Figure 9B:
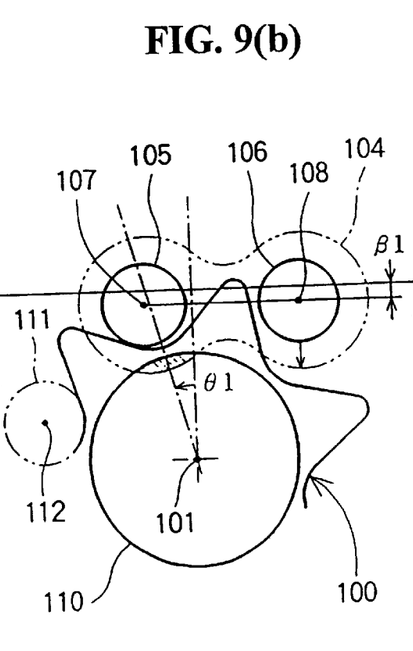

FIGS. 9(a)–9(b) are an operational view illustrating the state of meshing of a related sprocket having a resilient member and a roller chain. This configuration is substantially the same as the configuration shown in FIGS. 8(a)–8(c) and, the same numerals are applied therein after. A detailed description of the common elements is omitted.

In FIG. 9(a), are annular resilient members 110 are fitted to a side of the sprocket 100, rollers 111 are fitted in a freely rotatable manner to further link plates (not shown) for supporting the rollers 105 in a freely rotatable manner, and the rollers 111 are provided with centers of rotation 112.

Figure 9C:
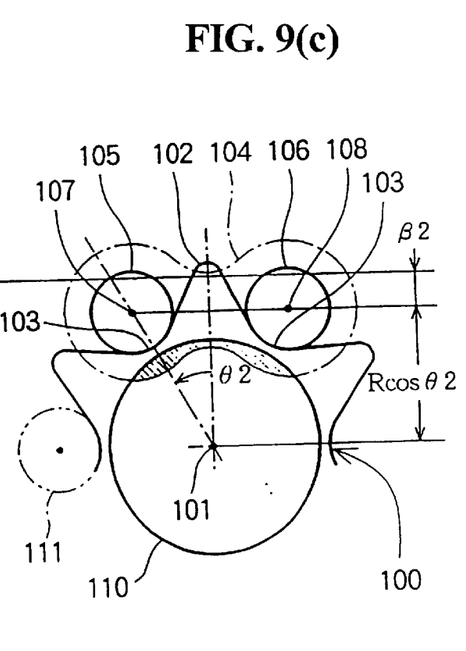

In FIGS. 9(a)–9(c), the teeth bottoms 103 of the sprocket 100 are positioned just above the centers of rotation 101.

The position of the rollers 105 is decided by the rollers 111 meshing with the resilient members 110 and the teeth bottoms 103 so that edges of the link plates 104 collide with the resilient members 110 and the rollers 105 therefore float from the teeth bottoms 103 of the sprockets 100.

The wrapping radius of the roller chain in this case is taken to be (R+d1). The portions where the link plates 104 and the resilient members 110 overlap, i.e. the portions where the resilient members 110 are pushed so as to be compressed by the edge of the link plate 104, are subjected to hatching.

In FIG. 9(b), when the sprocket 100 rotates by an angle of θ1 in an counter-clockwise direction from the state in FIG. 9(a), the rollers 105 and 106 move in an integral manner, the link plates 104 press and compress the resilient members 110, and the centers of rotation 107 of the rollers 105 and the centers of rotation 108 of the rollers 106 fall by just a distance β1 from the position of FIG. 9(a).

In FIG. 9(c), when the sprocket 100 rotates in an counter-clockwise direction so as to give rotation through an angle θ2 from the state in FIG. 9(a), the teeth 102 become positioned just above the centers of rotation 101 and, the resilient bodies 110 are further compressed by a coercive force of the link plates 104 occurring due to the tension of the roller chain. The rollers 105 then mesh with the teeth bottoms 103 and the rollers 106 also mesh with the teeth bottoms 103 due to the compression of the resilient body 110.

The wrapping radius of the roller chain in this case is R cos θ2, and an amount of vibration of the roller chain in a vertical direction β2 is β2=R+d1-R cos θ2.

At this time, the link plates 104 collide with the resilient members 110 before the rollers 105 and 106 collide with the teeth bottoms 103 and the noise occurring when the rollers 105 and 106 collide with the teeth bottoms 103 is therefore absorbed.

Figure 10:
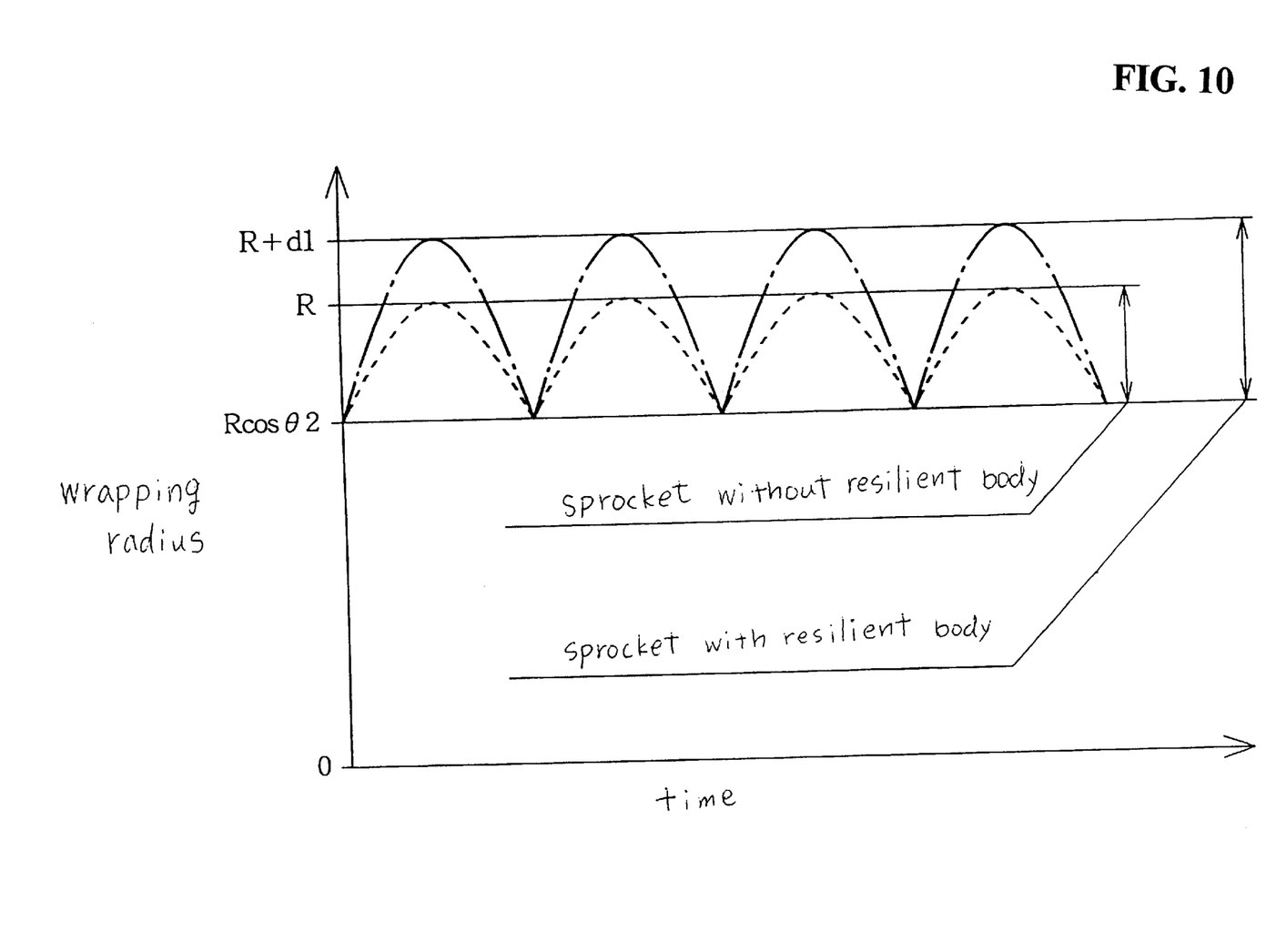
FIG. 10 is a graph illustrating changes in the wrapping radius of a sprocket of the related art.

FIG. 10 is a graph illustrating changes in wrapping radius of a related sprocket and also shows changes in the wrapping radius of the roller chain for the sprocket with no resilient body described in FIGS. 8(a)–(c) and the sprocket with a resilient body described in FIGS. 9(a)–(c), with the vertical axis showing a wrapping radius and the horizontal axis showing time.

The wrapping radius changes from R cos θ2 to R for the sprocket with no resilient body shown by the broken lines.

The wrapping radius changes from R cos θ2 to R(d+1) for the sprocket with a resilient body shown by the dashed lines.

From the above, with the sprocket 100 with the resilient body, an amount of vertical vibration d1 of the roller chain becomes larger to the extent of d1=β2-α2 compared to the sprocket 100 with the resilient body due to the resilient body 110. This means that there is little reduction in noise due to the collisions of the teeth bottoms 103 and the rollers 106 or in noise due to vibration of the roller chain itself.

A chain transmission apparatus for reducing noise and improving quality based on a chain transmission assembly that combines a sprocket having a resilient member 110 and a roller chain as described in FIGS. 9(a)–9(c) is disclosed in, for example, Japanese Laid-open Patent Publication No. Sho. 61-82164 entitled "Quiet Chain Approximation," Japanese Patent Laid-open Publication No. Hei. 63-214566 entitled "sprocket," and Japanese Patent Laid-open Publication No. Sho. 63-251654 entitled "Chain-Type Transmission Assembly."

In FIG. 1 of aforementioned publication No. Sho. 61-82164, a shock-absorbing ring 15 composed of a resilient body is fitted to a boss 14 of a sprocket b, link plates 11 of a roller chain a and formed in a substantially oval shape. A roller chain a meshes with a sprocket b to provide a quiet chain mechanism.

Further, in FIG. 3 of aforementioned publication No. Hei 63-214566, a chain 6 with link plates 6a are formed in an hourglass-shape. A sprocket 3, is provided wherein a side includes a resilient body 13 so that the chain 6 with an outer periphery of a wave shape makes contact in a uniform manner. In FIG. 5 of this publication, a chain formed by the hourglass-shaped link plates 106a and a sprocket, are provided wherein a side of the sprocket is fitted with an annular resilient body 113.

In FIG. 3 of aforementioned publication No. Sho. 63-251654, a chain type transmission assembly is disclosed wherein rolling plates 19 of a roller chain 13 are flat and oval in shape, pin link plates 21 are shaped like an hourglass, and a drive sprocket 11 is provided with an annular resilient body 17, and end surfaces 19a of the roller link plates 19 collide with the annular resilient body 17.

With the technology in aforementioned publication No. Sho. 62-82164, the cross-sectional area of a central part is larger than other portions at a central part in a direction orthogonal to a longitudinal direction of the link plates 11 because the link plates 11 are substantially orthogonal. The tensile strength in the case where tensile force acts via two pins 12 at the link plates 11 is therefore at a maximum at a central section, this central section therefore has to be stronger than necessary, and the weight of the assembly therefore increases.

With the technology of aforementioned publication No. Hei. 63-214566, with the combination of the resilient body 13 and the link plate 6a, an outer peripheral section at the pins at two locations of the link plate 6a collide with the resilient member 13 in a substantially uniform manner. The original tension of the chain 6 is therefore substantial in order to take into consideration the generation of noise due to the vibration of the chain itself as set forth in the combination of the annular resilient body 113 and the link plate 106a shown in FIG. 5 of this publication.

With the technology in publication No. Sho. 63-251654, when roller link plates 19 of the roller chain 13 collide with the annular resilient body 17 of the drive sprocket 11, striking of the drive sprocket 11 and the roller chain 13 is suppressed the structure is such that pin link plates 21 of the roller chain 13 do not strike the annular resilient body 17. Consideration therefore has to be given to the occurrence of noise due to the colliding of the drive sprocket 11 and the roller chain 13 at portions of the pin link plates 21.

Further, because the roller link plates 19 are flat and oval in shape, the weight of the roller chain 13 also increases.

SUMMARY AND OBJECTS OF THE INVENTION

It is therefore an object of the present invention to provide a chain transmission assembly capable of effectively suppressing the occurrence of noise at the time of meshing of a sprocket and a roller chain, while making a roller chain light in weight.

In order to achieve this object, a chain transmission assembly is provided, that is fitted with an annular resilient member at a side of a sprocket, with edges of hourglass-shaped link plates of a roller chain wrapped around the sprocket being received by the resilient body, and with the resilient body absorbing noise occurring when the roller chain meshes with the sprocket, wherein projections colliding with constricted portions at the centers of the hourglass-shaped link plates are provided at the resilient body.

By having projections collide with constricted portions at the centers of hourglass-shaped link plates, when the roller chain starts to mesh with the sprocket, the edges of a hourglass-shaped link plates of the roller chain are pushed radially outwardly by the projections of the resilient member.

As a result, the amplitude of vibrations occurring as a result of the roller chain meshing with a sprocket can be made small, vibrations of each part of the roller chain can be made small, and noise emanating from the chain itself can be suppressed.

Further, the collision speed at the time when rollers of the roller chain collide with the teeth bottoms of the sprocket can be reduced and the occurrence of noise due to these collisions can be suppressed.

Moreover, because an hourglass-shaped link plate is used, the link plate can be made lighter than when using a flat and oval shaped or oval shaped link plate and the roller chain can therefore also be made lightweight.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
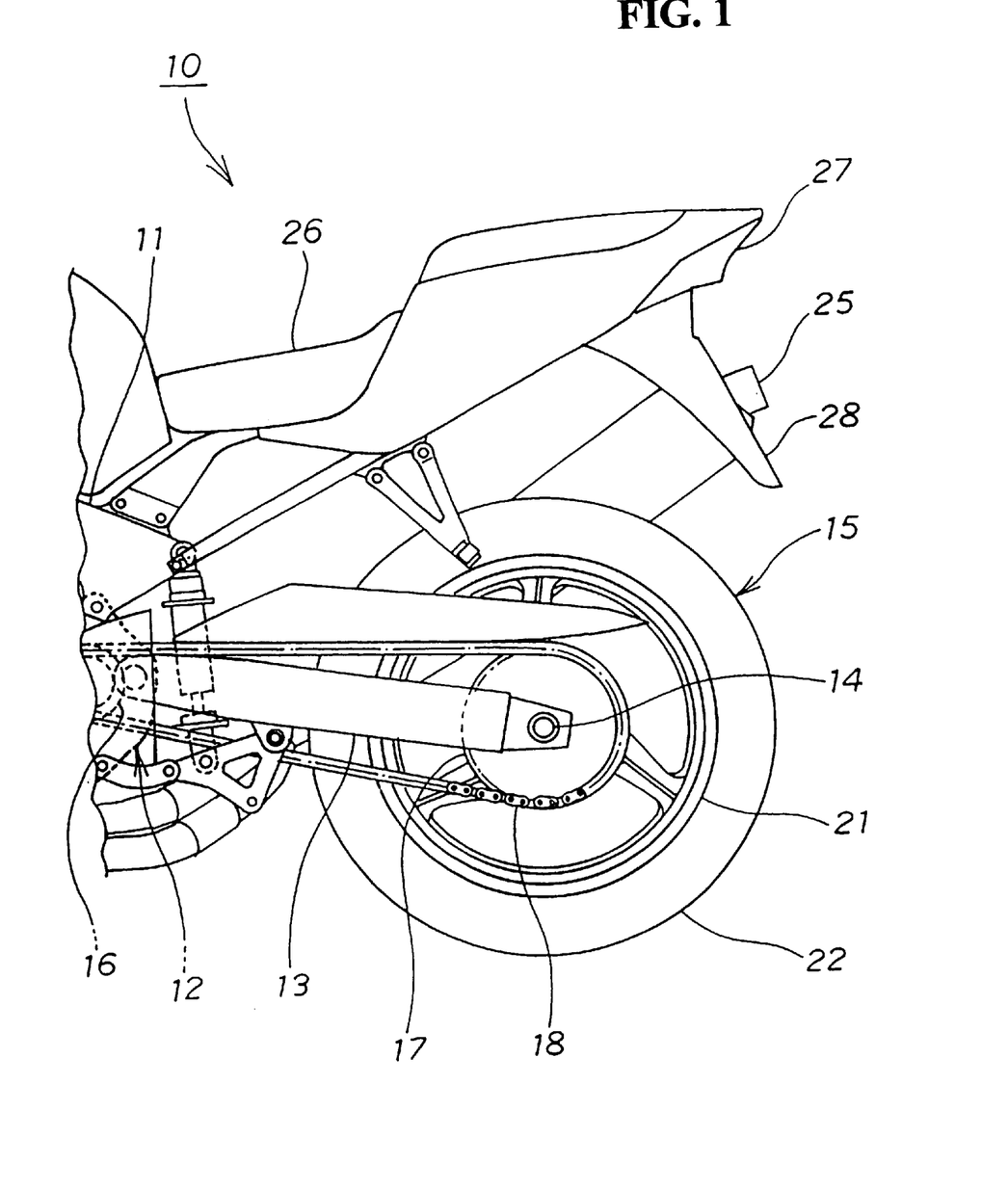
FIG. 1 is a side view of essential parts of a motorcycle provided with a chain transmission assembly to which the present invention relates.

Embodiments of the present invention will now be described in the following based on the attached drawings. FIG. 1 is a side view of the essential parts of a motorcycle equipped with the chain transmission assembly of the present invention. A motorcycle 10 includes a power unit 12 consisting of an engine and a transmission fitted to a vehicle frame 11. A free-swinging swing arm 13 is fitted to a rear section of the power unit 12. A rear wheel 15 is fitted in a freely rotatable manner to the rear end of the swing arm 13 via an axle 14. A roller chain 18 is wrapped around a drive sprocket 16 constituting the output side of the power unit 12 and a driven sprocket 17 is fitted to the rear wheel 15.

The rear wheel 15 includes a wheel 21 and a tire 22 fitted to the wheel 21. Further, a muffler 25, seat 26, tail lamp 27 and rear fender 28 are also provided. The drive sprocket 16, driven sprocket 17 and roller chain 18 constitute the chain transmission assembly 30 of the present invention.

Figure 2:
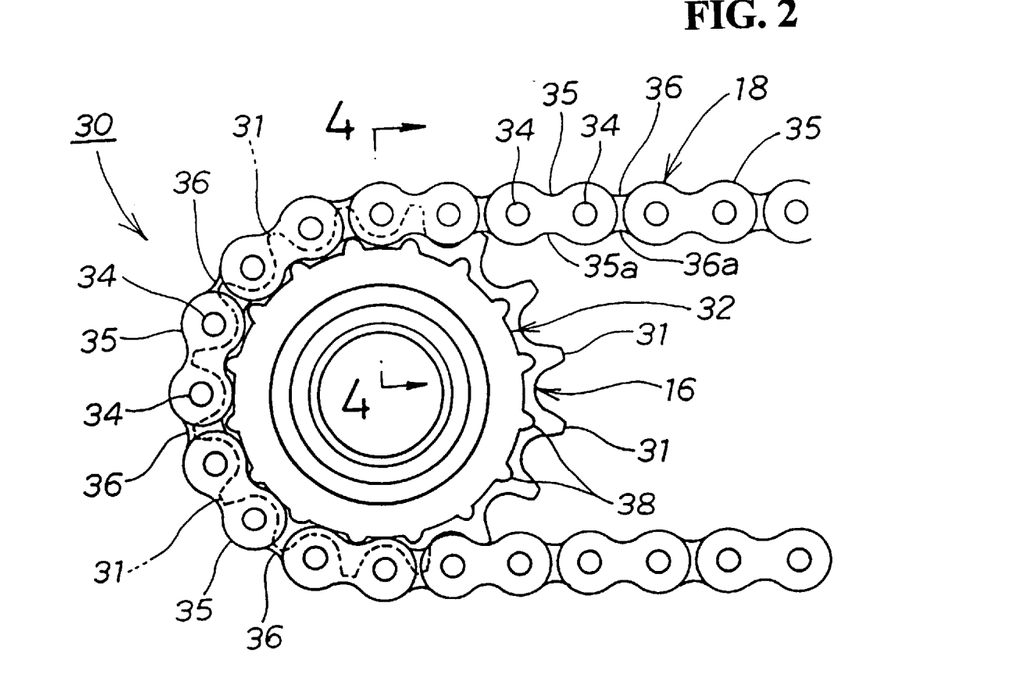
FIG. 2 is a side view of the chain transmission assembly of the present invention.

FIG. 2 is a side view of a chain transmission assembly of the present invention illustrating a situation where the roller chain 18 meshes with the drive sprocket 16 of the chain transmission assembly 30. The drive sprocket 16 has teeth 31 . . . formed at an outer periphery, with annular resilient bodies 32, fitted on either side.

The roller chain 18 includes pairs of pin link plates 35, 35 (the numeral 35 for the inner side is not shown) fixed by pins 34, 34, and pairs of roller link plates 36, 36 (the numeral 36 for the inner side is not shown) sandwiching the rollers in a freely rotatable manner mutually coupled using a pin 34.

The pin link plates 35 and the roller link plates 36 have outer shapes that are the same size and are both hourglass-shaped.

Constricted portions 35a and 36a are provided at the centers of the pin link plates 35 and the roller link plates 36.

The pin link plates 35 and the roller link plates 36 have the same shape when viewed from the side, and come into contact with the annular resilient member 32 under the same conditions.

When the number of teeth of the sprocket is an odd number, a constricted portion 35a of a pin link plate 35 and a constricted portion 36a of the roller link plate 36 alternately come into contact with the same projection 38 but contact is always made with the projection 38 under the same conditions.

Figure 3:
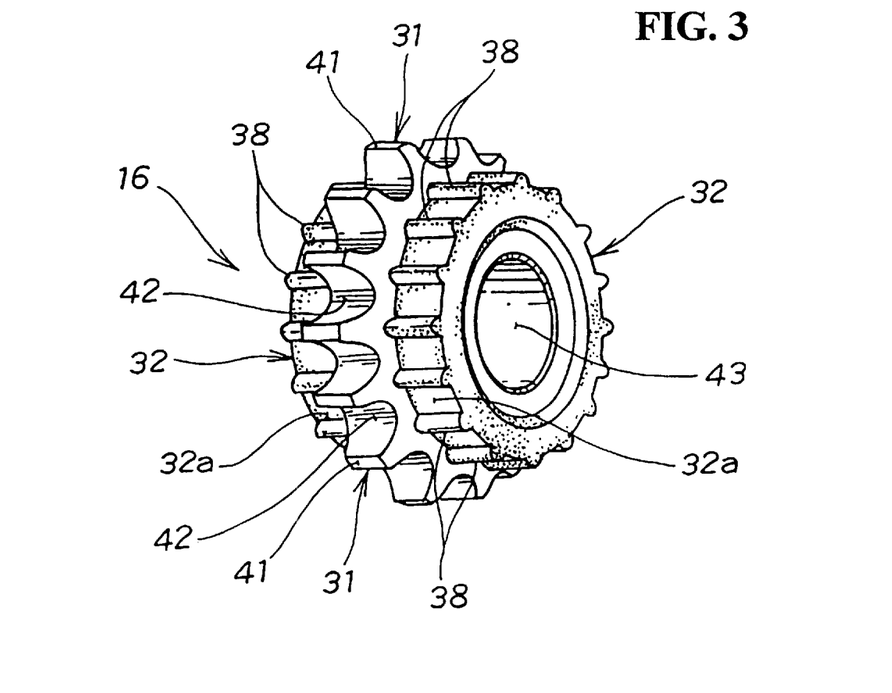
FIG. 3 is a perspective view of a sprocket of the chain transmission assembly of the present invention.

FIG. 3 is a perspective view of a sprocket of a chain transmission assembly of the present invention. The drive sprocket 16 is equipped with the projections 38 parallel to the sprocket axle at outer peripheral surfaces 32a, 32a of the annular resilient body 32, 32 occurring radially inwards from the teeth 31 . . . . Also, as shown in FIG. 3, tooth tips 41, tooth bottoms 42, and fitting holes 43 for fitting to the output shaft of the power unit 12 are provided (refer to FIG. 1).

Hard rubber or urethane is suitable as a material for the annular resilient body 32.

Figure 4:
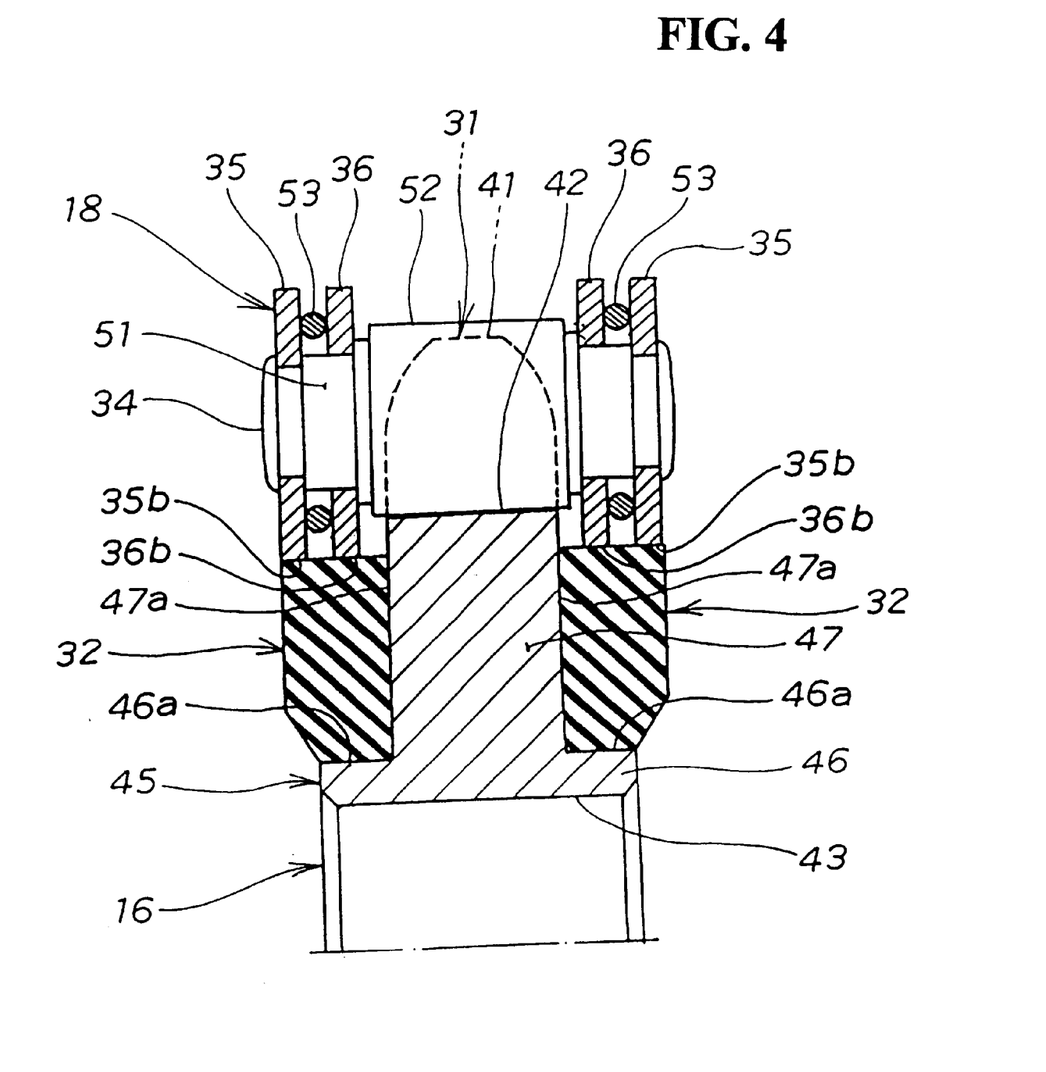
FIG. 4 is a cross-sectional view along line 4—4 of FIG. 2.

FIG. 4 is a cross-sectional view along line 4—4 of FIG. 2. The drive sprocket 16 is formed with a boss section 46 and a disc section 47 broadening out radially from this boss section 46 at a sprocket main body 45 made from steel or cast-iron and has annular resilient members 32, 32 fixed to outer peripheral surfaces 46a, 46a of the boss 46 and side surfaces 47a, 47a of the disc section 47 by welding or bonding.

At the roller chain 18, a bush 51 is fitted at the pin 34, and a roller 52 is fitted in a freely rotatable manner at the bush 51. This roller 52 is then sandwiched by the roller link plates 36, 36. O-rings 53, 53 are then fitted to both ends of the bush 51 from the outer side of the roller link plates 36, 36, and these O-rings 53, 53 are sandwiched by the roller link plates 36, 36 and the pin link plates 35, 35 so that both ends of the pin 34 become fixed at the pin link plates 35, 35.

The O-ring 53 is for holding oil for lubricating between the pin link plates 35 and the roller link plates 36.

Edges 35a and 36a of the pin link plate 35 and the roller link plate 36 collide with the outers surfaces 32a of the annular resilient bodies 32, 32 of the drive sprocket 16.

When the roller chain 18 meshes with the drive sprocket 16, prior to the rollers 52 colliding with the teeth bottoms 42, at the resilient body 32, the outer peripheral surfaces 32a, 32a collide with the edges 35b, 35b of the pin link plates 35, 35, in particular with the edges 36b, 36b of the constricted portion 35a and the roller link plate 36, and in particular collide with the constricted portion 36a, so that the generation of noise is suppressed.

The following is a description of the operation of the chain transmission assembly 30 described above.

FIGS. 5(a) to 5(e) are explanatory views for describing the operation of the chain transmission assembly of the present invention.

Figures 5A, 5B, 5C, 5D, 5E:
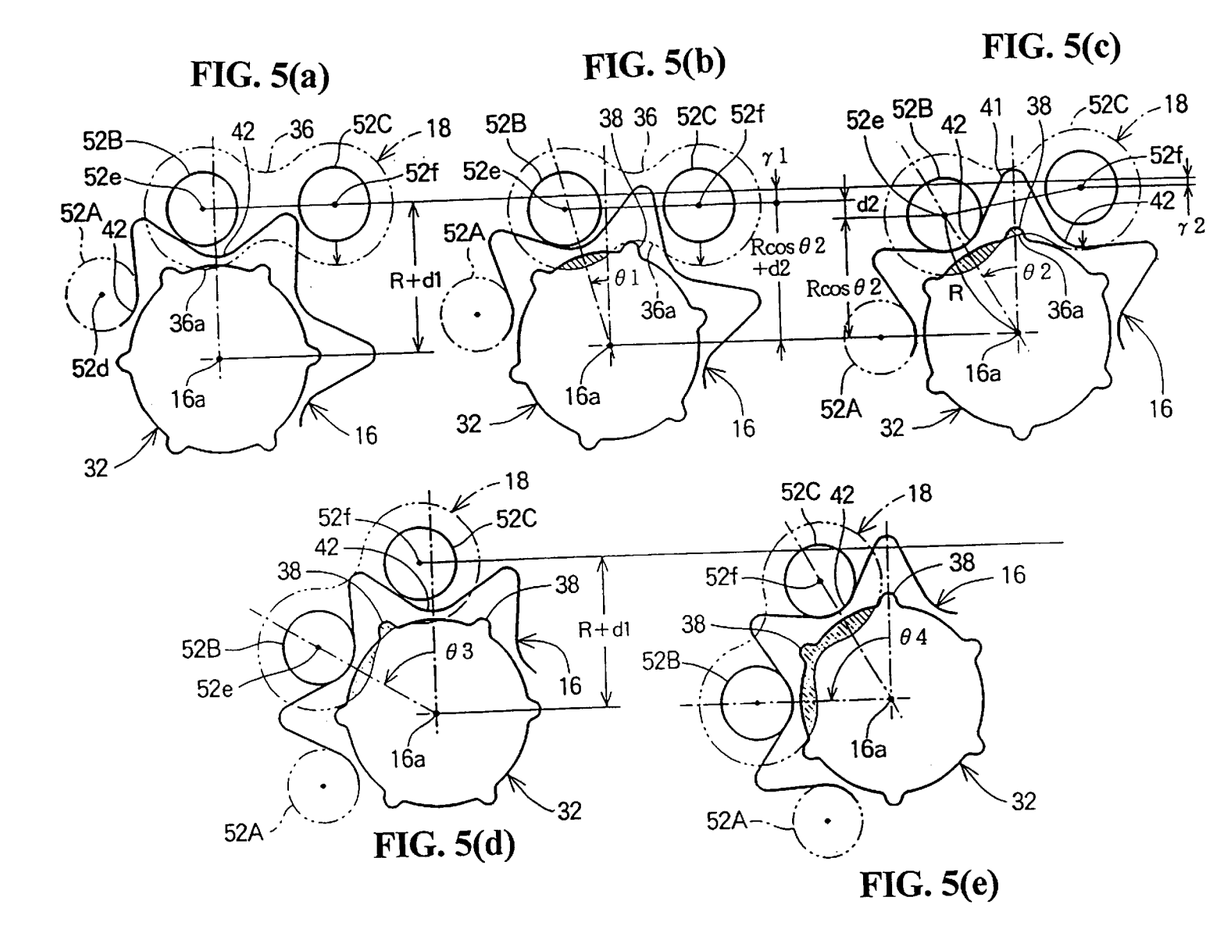
FIGS. 5(a)–5(e) are explanatory views for describing the operation of the chain transmission assembly of the present invention.

FIG. 5(a) shows the situation when the roller chain 18 meshes with the drive sprocket 16. The number of teeth has been reduced and are just partially shown for the drive sprocket 16 for ease of description. Further, for the roller chain 18, the rollers are taken to be 52A, 52B and 52C for convenience, and the just one roller link plate 36 is shown. The rollers 52B and 52C are for supporting the roller link plate 36 and the roller 52A is next to the roller 52B.

A center of rotation 16a of the drive sprocket 16 is provided, and 52d, 52e and 52f are the centers of rotation of the rollers 52A, 52B and 52C.

In FIGS. 5(a)–5(e), the teeth bottoms 42 of the drive sprocket 16 are positioned just above the center of rotation 16a.

An edge 36b of the roller link plate 36 collides with the annular resilient body 32, and the position of the roller 52B is decided by the roller 52A meshing with the annular resilient member 16a and the tooth bottom 42, and floats from the tooth bottom 42 of the drive sprocket 16.

The wrapping radius of the roller chain 18 at this time is the same (R+d1) as the wrapping radius of the roller chain shown in FIGS. 9(a)–9(c).

The portions where the roller link plates 36 and the annular resilient members 32 overlap, i.e. the portions where the annular resilient members 32 are pushed so as to be compressed by the edge of the roller link plate 36 are subjected to hatching.

In FIG. 5(b), when the drive sprocket 16 is rotated by an angle of θ1 in a counter-clockwise direction from the state in FIG. 5(a), the rollers 52B and 52C move in an integral manner, the roller link plates 36 press and compress the resilient member 32, and the center of rotation 52e of the roller 52B and the center of rotation 52f of the roller 52C fall by just a distance ∝1 from the position of FIG. 5(a). At this time, the projection 38 of the annular resilient body 32 starts to collide with the constricted portion 36a of the roller link plate 36.

In FIG. 5(c), the drive sprocket 16 rotates further in the counter-clockwise direction, so that when there is rotation by an angle θ2 from the state in FIG. 5(c) so that the tooth tip 41 is positioned just above the center of rotation 16a, the annular resilient body 32 is compressed via the roller link plate by the tension of the roller chain 18 and the roller 52B meshes with the tooth bottom 42. The roller 52C then approaches the tooth bottom 42 but the projection 38 collides with the constricted portion 13a of the roller link plate 36 50 that the projection 38 pushes the roller 52C upwardly and a drop ∝2 in the roller 52C is small, i.e. this becomes ∝2<∝1.

In this case, the distance in the vertical direction between the center of rotation 16a of the drive sprocket 16 and the center of rotation 52e of the roller 52B becomes R cos θ2, so the wrapping radius (minimum value) of the roller chain 18 of FIG. 5(b) becomes (R cos θ2 +d2), and the amount of vibration in the vertical direction of the roller chain 18 becomes ∝1.

In FIG. 5(d), the drive sprocket 16 is further rotated so that (a) when there is rotation through an angle θ3 from the state in FIG. 5(a) so that the tooth bottom 42 is again positioned just above the center of rotation 16a, the annular resilient member is compressed, and when the roller 52C approaches the tooth bottom 42, positioning is the same as for the roller 52B shown in FIG. 5(a).

In FIG. 5(e), the drive sprocket 16 is rotated further so that when an angle θ4 is gone through from the state in FIG. 5(a), the annular resilient body 32 is further compressed, and the roller 52C meshes with the tooth bottom 42. The position of the roller 52C at this time is the same as shown for the roller 52B shown in FIG. 5(c).

Figure 6:
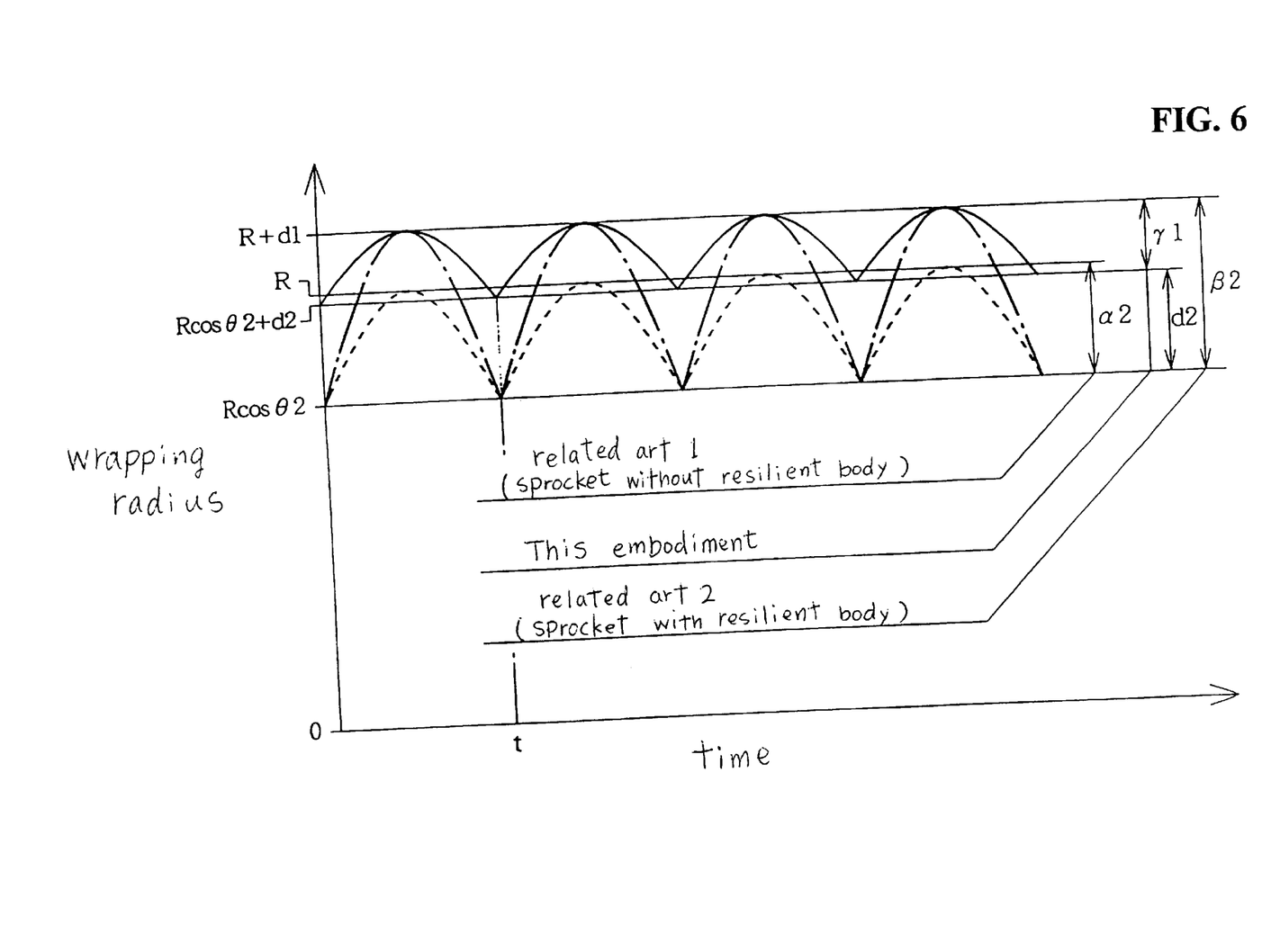
FIG. 6 is a graph illustrating changes in the wrapping radius of the sprocket of the chain transmission assembly of the present invention.

FIG. 6 is a graph illustrating changes in wrapping radius of a sprocket of the chain transmission assembly of the present invention and also shows changes in the wrapping radius of the roller chain for the sprocket with no resilient body described in FIG. 8 and the sprocket with a resilient body described in FIG. 9. Here, the vertical axis shows wrapping radius and the horizontal axis shows time.

The wrapping radius changes from (R cos θ2+d2) to (R+d1) for the sprocket with no resilient body shown by the solid lines.

Namely, in this embodiment, the wrapping radius is the same (R+d1) as related art Publication No. Hei. 63-214566, but the minimum wrapping radius is larger than that of related art Publication No. Hei. 63-214566, i.e. this becomes larger because the roller chain 18 is pushed a distance d2 in the radial direction by the projection 38 of the resilient body 32 so as to broaden.

Therefore, in this embodiment, meshing with the drive sprocket 16 is made smooth by adopting an annular resilient body 32 where the vibration is smaller than for the related technology (a sprocket with a resilient body), and noise can therefore be suppressed.

Further, in related art 1 Publication No. Sho. 61-82164, related art Publication No. Hei. 63-214566 and this embodiment, the time taken from the wrapping radius being a minimum, becoming a maximum, and then returning to a minimum is taken to be t.

With related art Publication No. Hei. 63-214566, the wrapping radius changes by just 2×(R+d1−cos θ2) during the time t, but in this embodiment, the wrapping radius changes by just 2×(R+d1−R cos θ2−d2) during time t. The change (rate of change of wrapping radius) CH1, CH2 per unit time in related art 2 and in this embodiment therefore become CH1=2×(R+d1−R cos θ2)/t, and CH2=2×(R+d1−R cos θ2 respectively.

Therefore, CH1>CH2, i.e. the rate of change of the wrapping radius of this embodiment CH2 is smaller than the rate of change of the wrapping radius of the related art 2. In this embodiment, this is shown by the average speed when the roller 52C collides with the tooth bottom 42 being slower than the case for the related art Publication No. Hei. 63-214566.

As described above in FIG. 2 to FIG. 4, at the chain transmission assembly 30 where the annular resilient body 32 is fitted to the side surface 47a of the drive sprocket 16, the edge 35b of the hourglass-shaped pin link plate 35 of the roller chain 18 is wrapped around the drive sprocket and the edge 36b of the roller link plate 36 is received by the annular resilient member 32, and where the impact of the roller chain 18 with the drive sprocket 16 is absorbed, there is provided a projection 38 colliding with the constricted portion 35a at the center of the hourglass-shaped pin link plate 35 and the constricted portion 36a at the center of the roller link plate 36.

With this configuration, the amplitude of vibrations occurring as a result of the roller chain 18 meshing with the drive sprocket 16 can be made small, vibrations of each part of the roller chain 18 can be made small, and the noise emanating from the roller chain 18 itself can be suppressed.

Further, the collision speed at the time when rollers 52 of the roller chain 18 collide with the teeth bottoms 42 of the drive sprocket 16 can be reduced and the occurrence due to noise due to these collisions can be suppressed. Moreover, because hourglass-shaped link plates 35 and 36 are used, the link plates 35 and 36 can be made lighter than when using a flat and oval shaped or oval shaped link plate and the roller chain 18 can therefore also be made lightweight.

Figure 7A:
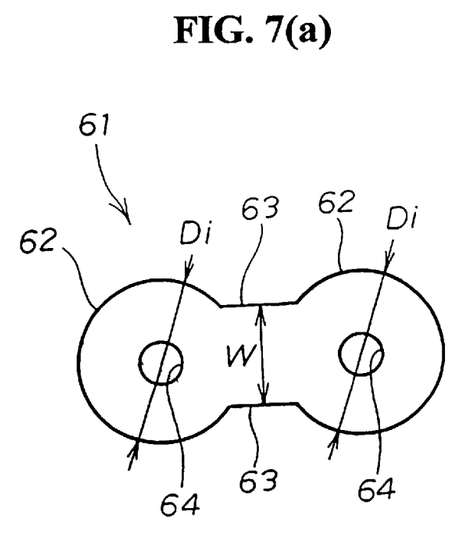
FIGS. 7(a) and 7(b) are plan views showing a further embodiment of link plates of the roller chain of the chain transmission assembly of the present invention.
Figure 7B:
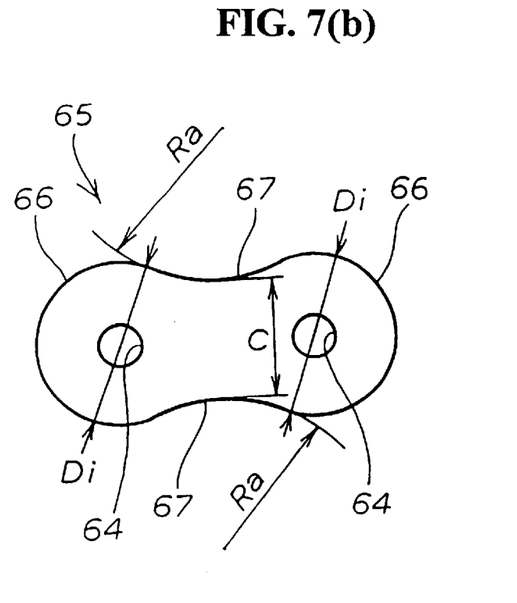

FIGS. 7(a) and 7(b) are a plan views showing a further embodiment of link plates of a roller chain of a chain transmission assembly of the present invention. In FIG. 7(a), the pin link plate 61 is formed in a shape of two circular arcs 62, 62, connected by parallel straight lines 63, 63. Pin holes 64, 64 are opened up at the center of the circular arcs 62, 62 to allow the pins 34, 34 (refer to FIG. 2) to pass.

The straight lines 63 are the portions that collide with the projections 38 of the drive sprocket 16 shown in FIG. 2.

When the diameter of the circular arcs 62, 62 is taken to be Di, and the distance between the parallel straight lines 63, 63 is taken to be W, then W<Di.

In FIG. 7(b), a pin link plate 65 is formed in a shape of two circular arcs 66, 66, and two circular arcs 67, 67 of radius Ra intersecting at the circular arcs 66 and 66. Pin holes 64, 64 are then opened up at the center of the circular arcs 66, 66.

The circular arcs 67 are the portions that collide with the projections 38 of the drive sprocket 16 shown in FIG. 2.

When the distance between the circular arcs 67, 67 is taken to be C, then C<Di.

The shape of the projection 38 of the drive sprocket 16 shown in FIG. 3 is by no means limited to the shapes shown in the drawing, and may also have a cross-sectional shape that is, for example, rectangular, triangular, or trapezoidal.

The present invention achieves the following effects with the above described configuration.

The chain transmission assembly of claim 1 is provided with projections colliding with constricted portions at the centers of the hourglass-shaped link plates at a resilient member. As a result of this colliding, when the roller chain starts to mesh with the sprocket, the contracted portions at the center of the hourglass-shaped link plate of the roller chain are pushed radially outwards from the sprocket by the projections of the resilient body.

As a result, vibrations occurring as a result of a roller chain meshing with a sprocket can be reduced, vibrations of each part of the roller chain can be made small, and noise can be suppressed.

Further, the collision speed at the time when rollers of the roller chain collide with the teeth bottoms of the sprockets can be reduced and the occurrence due to noise due to these collisions can be suppressed. Moreover, because a hourglass-shaped link plate is used, the link plate can be made lighter than when using a flat oval shaped or oval shaped link plate and the roller chain can therefore also be made lightweight.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A chain transmission assembly comprising:
   a sprocket having a first side and a second side;
   an annular resilient member positioned on at least one side of said sprocket; and
   a roller chain having pin link plates and roller link plates which are identically formed and symmetrical in a longitudinal direction and include constricted portions,
   said pin link plates each being fixed by pins, and said roller link plates being wrapped around the sprocket and being received by the resilient member,
   said resilient member absorbing noise occurring when the roller chain meshes with the sprocket by said roller link plates engaging said resilient member,
   wherein projecting portions are formed between outwardly facing convex-shaped arcs of an outer surface of said annular resilient member, the projecting portions corresponding to said constricted portions of the pin link plates and the roller link plates, and
   wherein said projecting portions collide with said constricted portions of said link plates upon rotation of the sprocket, thereby pushing said roller chain outward in a radial direction by a predetermined distance, and thereby causing a reduction in an inward radial drop of rollers of the chain by an amount equal to said predetermined distance.

2. The chain transmission assembly according to claim 1, wherein said annular resilient member is positioned on both said first side and said second side of said sprocket for engaging said link plates as said roller chain meshes with said sprocket.

3. The chain transmission assembly according to claim 1, wherein said link plates are hour-shaped link plates.

4. The chain transmission assembly according to claim 1, wherein said link plates are formed by two circular arcs connected by parallel lines.

5. A noise suppressing mechanism for a chain drive comprising:
   a sprocket including a first side and a second side and having an axle and a plurality of teeth disposed in a first plane, said teeth being disposed a first predetermined distance from said axle;
   a resilient member being disposed on at least one side of said sprocket and projecting a second predetermined distance from said axle, said second predetermined distance being less than said first predetermined distance; and
   a chain including engaging members for engaging the teeth of said sprocket, pin link plates being fixed by pins, and roller link plates for engaging said resilient member, said pin link plates and roller link plates being identically formed and symmetrical in a longitudinal direction;
   said resilient member absorbing noise occurring when the chain meshes with the sprocket by said roller link plates engaging said resilient member,
   wherein projecting portions are formed at intervals on a circular outer surface of said resilient member, said circular outer surface having a outwardly facing convex-shape portions between said arc-shaped projecting portions, said arc-shaped projecting portions occurring radially inward of the teeth of said sprocket, and
   wherein said projecting portions collide with said constricted portions of said link plates upon rotation of said sprocket, thereby pushing said roller chain outward in a radial direction by a predetermined distance.

6. The chain transmission assembly according to claim 5, wherein said resilient member is positioned on both said first side and said second side of said sprocket for engaging said link plates as said chain meshes with said sprocket.

7. The chain transmission assembly according to claim 5, wherein said link plates are hour-shaped link plates.

8. The chain transmission assembly according to claim 5, wherein said link plates are formed by two circular arcs connected by parallel lines.

9. The noise suppression mechanism for a chain drive according to claim 5, wherein the roller plates and the pin link plates are formed with identically shaped constricted portions, and the projecting portions correspond with said constricted portions of said roller plates and said pin link plates.

10. A sprocket for use in suppressing noise as a chain drive engages the sprocket comprising:
   said sprocket including a first side and a second side and having an axle and a plurality of teeth disposed in a first plane, said teeth being disposed a first predetermined distance from said axle; and
   a resilient member being disposed on at least one side of said sprocket and projecting a second predetermined distance from said axle, said second predetermined distance being less than said first predetermined distance; and
   said resilient member being adapted for absorbing noise occurring when a chain having pin link plates and roller link plates meshes with the sprocket by said roller link plates engaging said resilient member, wherein the pin link plates and the roller link plates are identically formed and symmetrical in a longitudinal direction,
   wherein a circular outer surface of said resilient member includes projecting portions formed thereon at regular intervals with outwardly facing convex arcs of the circular outer surface therebetween, said projecting portions occurring radially inward of teeth of said sprocket, and wherein said projecting portions collide with said constricted portions of said link plates upon rotation of said sprocket, thereby pushing said roller chain outward in a radial direction by a predetermined distance, and thereby increasing a minimum wrapping radius of the chain by said predetermined distance.

11. The chain transmission assembly according to claim 10, wherein said resilient member is positioned on both said first side and said second side of said sprocket.

12. The sprocket for use in suppressing noise as a chain drive engages the sprocket according to claim 10, wherein the roller plates and the pin link plates are formed with identically shaped constricted portions, and the projecting portions correspond with said constricted portions of said roller plates and said pin link plates.

* * * * *